United States Patent [19]

Enderle et al.

[11] Patent Number: 5,129,733
[45] Date of Patent: Jul. 14, 1992

[54] DEVICE FOR PRELOADING A GUIDED MACHINE PART

[75] Inventors: Eckhard Enderle, Aalen-Dewangen; Werner Leitenberger, Heidenheim-Mergelstetten; Helmut Muller, Schwabisch Gmund-Grossdeinbach, all of Fed. Rep. of Germany

[73] Assignee: Carl-Zeiss-Stiftung, Heidenheim/Brenz, Oberkochen, Fed. Rep. of Germany

[21] Appl. No.: 661,703

[22] Filed: Feb. 27, 1991

[30] Foreign Application Priority Data

Jun. 5, 1990 [DE] Fed. Rep. of Germany ....... 4006853

[51] Int. Cl.⁵ ............................................. F16C 32/06
[52] U.S. Cl. ........................................ 384/10; 384/12; 384/16; 384/471
[58] Field of Search ...................... 384/10, 12, 16, 119, 384/100, 471

[56] References Cited

U.S. PATENT DOCUMENTS

| | | | |
|---|---|---|---|
| 4,558,909 | 12/1985 | Stauber | 384/12 |
| 4,726,689 | 2/1988 | Pollock | 384/12 |
| 4,749,283 | 6/1988 | Yokomatsu et al. | 384/12 |
| 4,822,182 | 4/1989 | Matsushita et al. | 384/471 |

Primary Examiner—Lenard A. Footland
Attorney, Agent, or Firm—Hopgood, Calimafde, Kalil, Blaustein & Judlowe

[57] ABSTRACT

The invention contemplates use of a suction bell to enhance the loading with which a guided machine part is gravitationally supported on its guide. In application to a machine in which the machine part is movably supported on air bearings, the suction bell applies a preload force of magnitude to optimize the stiffness of air-bearing action and to maintain an air gap of uniform capillary thickness, free of mechanical contact between the machine part and its supporting surface.

16 Claims, 4 Drawing Sheets

DEVICE FOR PRELOADING A GUIDED MACHINE PART

BACKGROUND OF THE INVENTION

In the guidance of movable measurement carriages of coordinate-measuring machines, air bearings are frequently used as the means of supporting the involved machine part on its guide. The loading of involved air bearings is a function of the gravitational weight of the guided part of the machine.

Relatively large loading forces are required in order to operate air bearings at their optimal working point, namely, the point at which they have the greatest possible stiffness. Necessarily, therefore, the guided part must be of a relatively great weight. But weight, on the other hand, imposes limitations on the obtainable accelerations or speeds with which the part can be moved.

The bearings of guided machine parts are frequently clamped via abutments which are under spring load. However, this technique is only economically feasible if the guided part is movable linearly in a single direction. On the other hand, if the involved guide is a so-called planar guide on which the machine part is movable simultaneously in two degrees of freedom, then it is practically impossible to provide the spring-loading which is necessary for the abutment.

So-called self-priming air bearings are known from U.S. Pat. No. 4,558,909. These air bearings are provided on their periphery with a suction channel which can be connected to a vacuum source, to draw the bearing against the involved guide surface. However, the preloading forces that can be produced with this known bearing are relatively slight, being less than optimal since the suction channel has an area that is less than that of the air bearing, and the pressure difference to produce the suction force is at most one atmosphere. Such slight forces are generally not sufficient to operate the bearing in the operating range which is optimal for the greatest possible stiffness.

Federal Republic of Germany OS 2,829,715 describes a coordinate-measurement machine having machine parts which are guided via air bearings, and which are also magnetically loaded against their guide surfaces. Such construction requires that the involved guide contain ferro-magnetic material. This is not advantageous, for various reasons.

BRIEF STATEMENT OF THE INVENTION

The object of the present invention is to create a preloading device for guided machine parts, wherein relatively high preloading forces can be produced without great manufacturing expense.

The invention achieves this object by providing an air-bearing system wherein spaced bearings movably support a machine part on a guide and wherein a suction bell for development of preloading force is arranged between the bearings.

The use of a suction bell between spaced bearings is particularly advantageous if the spaced bearings are air bearings coacting with a flat guide surface, since the means necessary for supply of pressure or vacuum are already on the machine, and the guide surface for the air bearings is flat and sufficiently large and can therefore simultaneously serve as the mating surface for the suction bell.

The effective surface area of the suction bell is advisedly large compared to the active surface of air-bearing support for the machine part, so that sufficiently high bearing-preload forces can be produced, even with relatively small pressure differences.

Furthermore, it is advantageous if the suction bell is mounted to the machine part in the vicinity of the points of support of said part, as for example if the suction bell is directly carried by the supporting air bearings. The flow of the preloading force is then removed from the machine part, thus avoiding deformation of the machine part.

The suction bell advisedly has an elastic sealing lip which has low-friction contact with the guide surface of the movable part and which seals the suction bell against said surface.

However, it is particularly advantageous to provide a self-guided capillary gap for sealing of the suction bell. This gap can be produced, for instance, by a ring which "floats" by means of pressure on the guide surface.

Since no contact is produced thereby between the sealing surface and the base, there is no friction and, accordingly, also no wear.

The invention affords particular advantage for the preloading of machine parts which are movably supported by a guide with two degrees of freedom, as for example with freedom to move in a single plane, and where it is difficult to provide wrap-arounds or mating magnetic armatures, both of which presuppose linear guides.

DETAILED DESCRIPTION

The invention will be described in detail in conjunction with the accompanying drawings, in which.

Figure 1:
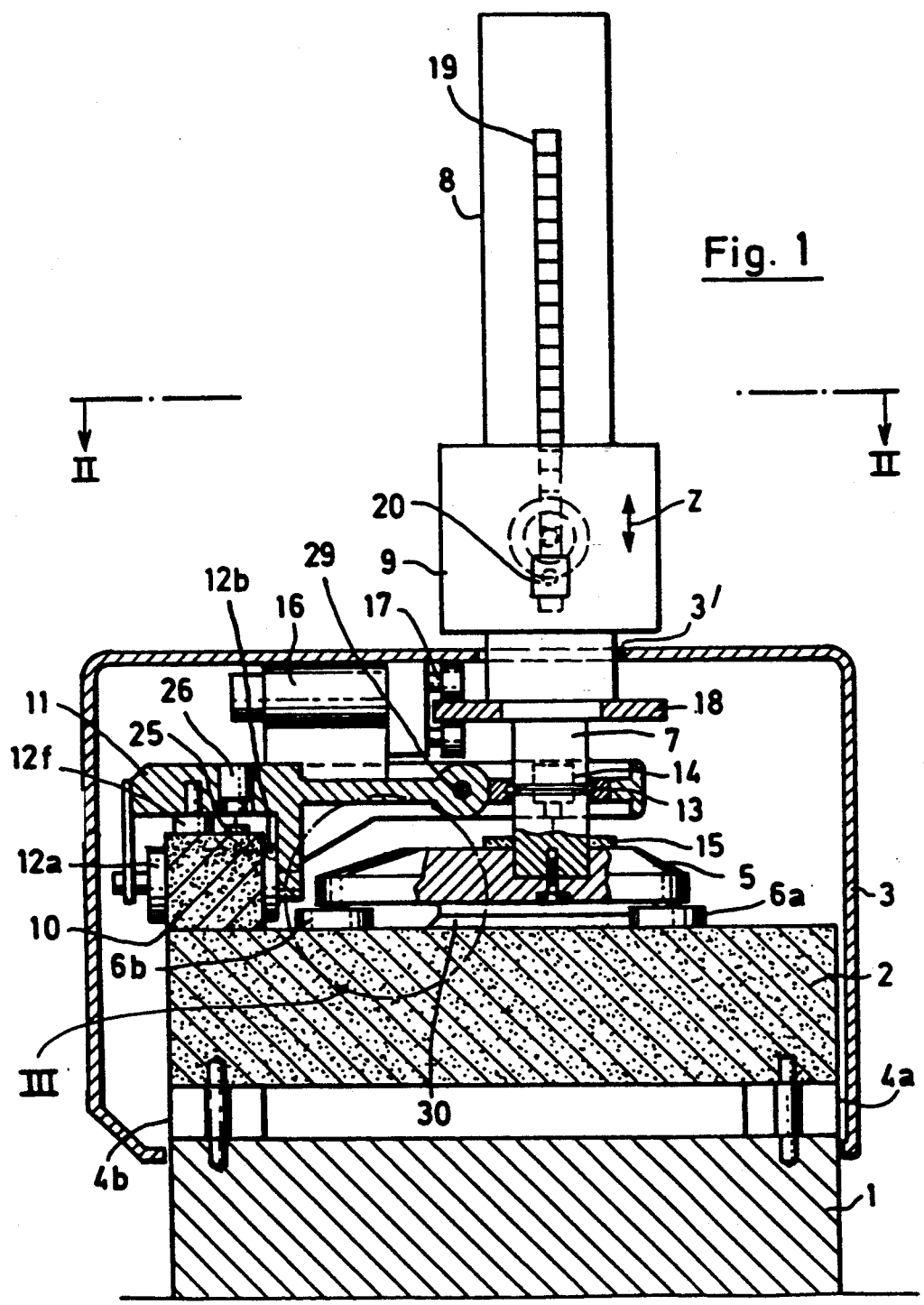
FIG. 1 is a view in end elevation of a coordinate-measuring machine which incorporates preloading means of the invention, the view being partly broken-away and in vertical section to show detail of supporting and actuating mechanical relationships.
Figure 2:
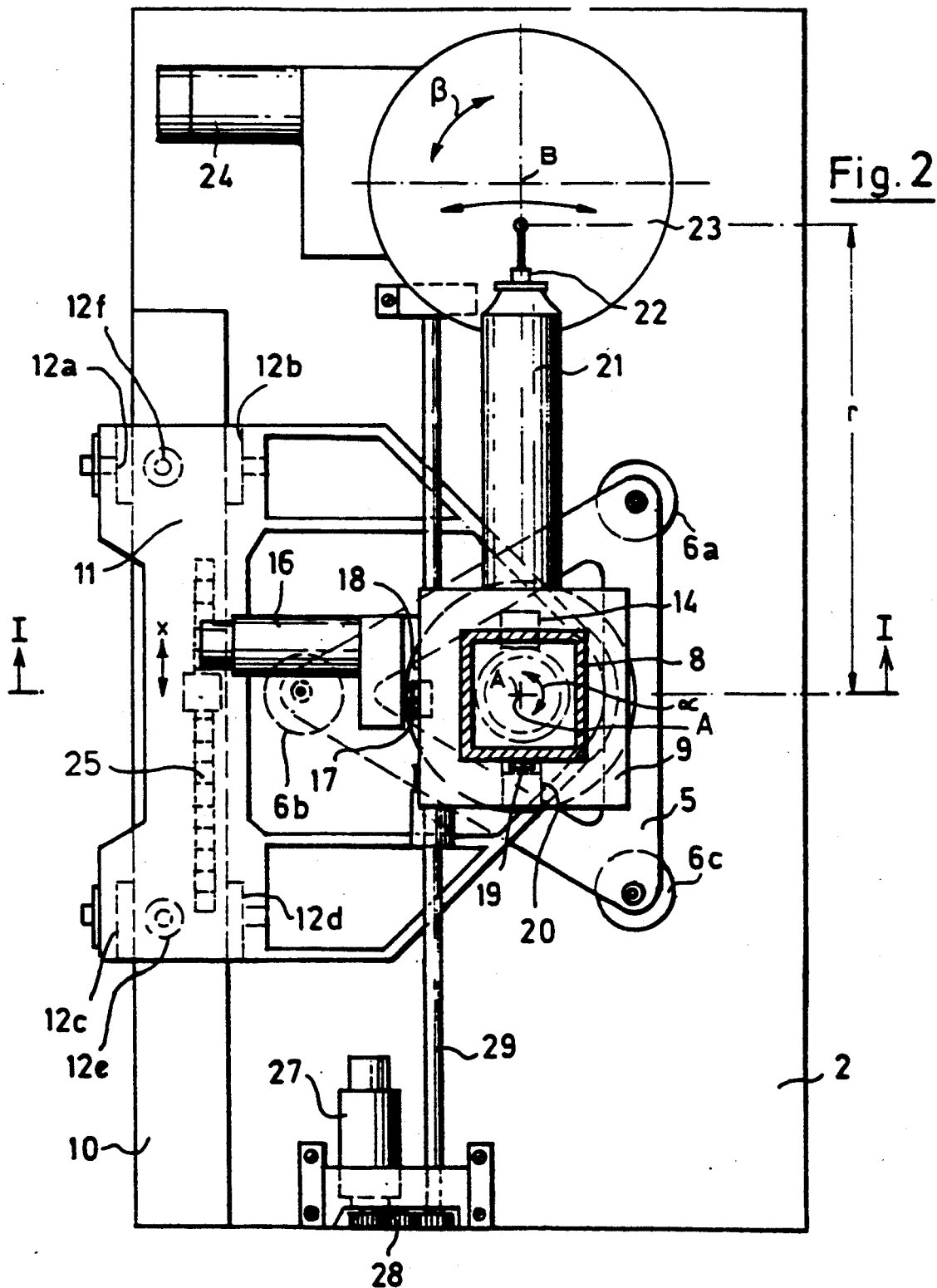
FIG. 2 is a plan view of the machine of FIG. 1, with cover plate removed, showing at I—I the section plane of FIG. 1, and a portion of FIG. 2 being in section at the plane II—II of FIG. 1.

The coordinate-measuring machine of FIGS. 1 and 2 has a machine table 2 which rests via four vibration dampers 4 on the foundation 1 of the machine; only two (4a, 4b) of these vibration dampers are visible in FIG. 1.

Table 2 provides a flat horizontal surface for three spaced air bearings 6a, b, c, at the base 5 of an upstanding column 8. Column 8 is linearly displaceable along this table surface and is also rotatable about its vertical axis A, as will be more fully described.

A carriage 11 is guided for linear horizontal displacement in the direction of double-headed arrow X in FIG. 2, relying on six air bearings 12a–f which react with three exposed elongate surfaces of a guide ledge 10 that is secured to a side of table 2. Carriage 11 is driven by a motor 27 and by a transmission 28 to a smooth elongate shaft 29, which extends through carriage 11; rotation of shaft 29 can be translated into longitudinal displacement of carriage 11, illustratively by a so-called roll-ring transmission on the carriage. Roll-ring transmissions are known per se and therefore detail of this transmission on carriage 11 is not shown. Longitudinal displacement of carriage 11 is tracked by a photoelectric sensor 26 which scans a scale 25 secured to the guide ledge 10.

Within carriage 11 a reduced cylindrical lower end portion 7 of column 8 provides connection to the column base 5, and portion 7 is inserted in and mounted to the inner ring of a radial bearing 13, the outer ring of which is mounted to carriage 11. The radial bearing 13 makes it possible to rotate column 8 about its axis A with respect to the carriage 11, as indicated by double-headed arrow $\alpha$ in FIG. 2. The base 5 is a fixed part of column 8; therefore, base 5 axially supports column 8 via the air bearings 6a–c, in reaction with the surface of table 2 while also freely accommodating column rotation about axis A. In this connection, the relatively large base spacings between air bearings 6a–c will be seen to prevent wobbling or tilting of column 8, whether in the course of rotary displacement of column 8 or in the course of linear displacement of the carriage 11.

To provide rotary displacement of column 8, the carriage 11 carries a motor 16 which drives a friction-wheel transmission 17, engaged to a disk 18 that is attached to column 8. The angular extent o of the rotary displacement is tracked by a photoelectric sensor 14 mounted to carriage 11 and positioned to scan a graduated circular scale 15 secured to base 5 of column 8.

Drives and measurement systems in the lower region of column 8 are protected by a cover 3, having an elongate slot 3' in its upper part, and extending in the X-direction of guidance. A cylindrical portion of column 8 extends through slot 3', and in the region above cover 3, column 8 is rectangular, being shown to be of square section and providing rotationally keyed and vertically displaceable guidance of a carriage 9, in the direction of the double-headed arrow Z of FIG. 1.

Carriage 9 mounts the measurement arm 21 of the coordinate-measuring machine, and a probe head 22 is shown attached to the front end of arm 21. Linear Z-direction displacement of carriage 9 is not shown in FIGS. 1 and 2, but will be understood to be carried within column 8.

At the table (2) end which faces the probe head 22, a turntable 23 is mounted for rotation about a vertical axis B, pursuant to motor drive by means 24. The axis A of column-8 rotation and the axis B of turntable-23 rotation have a longitudinally spaced parallel relation, defining a vertical plane which is preferably parallel and at least substantially parallel to the X-direction of carriage (11) guidance. Turntable 23 will be understood to be adapted for mounting reception of a workpiece to be measured, and a workpiece rotation will be understood to be measured in terms of angular displacement $\beta$, sensed by photoelectric means 94 tracking a circumferential scale associated with turntable 23.

In the process of measuring a workpiece, the probe head 22 is moved by means of the carriages 11 and 9 in the two orthogonal coordinate directions X and Z, pursuant to the control of their respective drive means 16 and 97. The conventional third-coordinate direction is omitted, being replaced by sluing displacement $\alpha$ of column 8 about axis A. In this connection, the probe head is subjected to an arcuate displacement which is of greater or lesser extent depending upon the effective length r of the measurement arm. This arcuate displacement is, however, entirely sufficient for purposes of workpiece-measuring contact, as long as the effective length of the measurement arm is long enough to reach all points to be measured on the workpiece, when it is considered that turntable 23 can be rotated about axis B to position all workpiece-measurement points within reach of probe head 22.

In order that drive 27 can move column 8 as rapidly as possible over the surface of table 2, column 8 is of lightweight construction, suitably of aluminum. For this reason, the weight of column 8 alone is not sufficient to load air bearings 6a–c for operation in the region of optimal stiffness. Therefore, a suction bell 30 is arranged between the air bearings 6a–c in the foot 15 of column 8; the open side of bell 30 faces the surface of table 2, and a vacuum condition within bell 30 provides an additional force, drawing column 8 against the guide surface.

Figure 3:
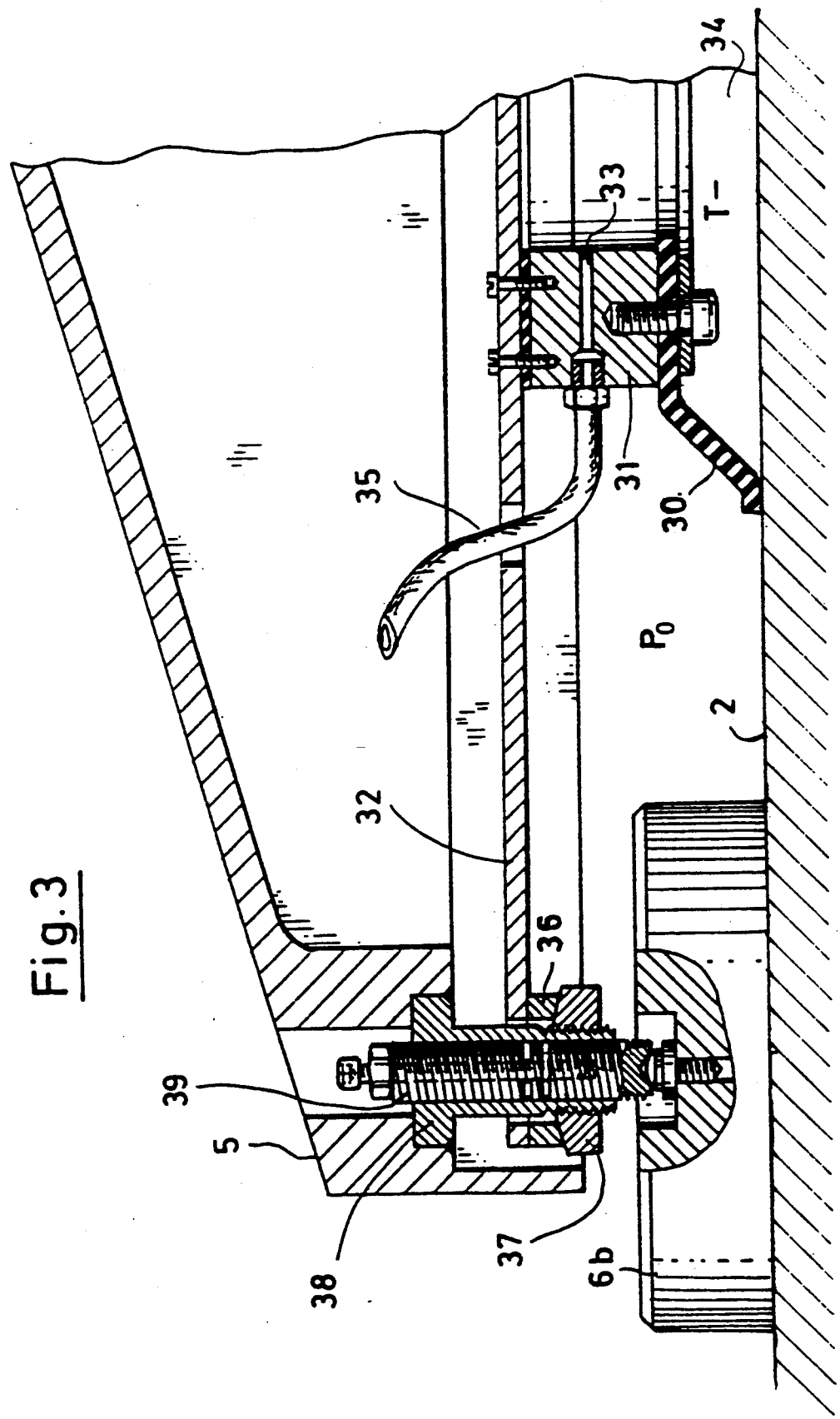
FIG. 3 is a greatly enlarged fragmentary vertical section, taken within the encircled region III of FIG. 1.

The construction and attachment of the suction bell 30 are seen in further detail in FIG. 3, which shows one (6b) of the three air bearings for support of the triangular foot 5 of column 8. Specifically, an adjustable counterbolt 39 of conventional construction is carried by foot 5; bolt 39 seats and locates on a spherical receiving part of the air bearing 6b. Counterbolt 39 is shown in threaded engagement with the bore of a support fitting 38 in the foot 5; and the reduced lower end of fitting 38 is externally threaded to receive a nut 37 having a convex spherical upper end. A spring plate 32, which has nested triangular conformance with the triangular shape of foot 5, axially engages nut 37 via the concave spherical underside of an intermediate ring element 36. It will be understood that this spring plate 32 has a similarly engaged relation to identically nutted counterbolt suspensions which ride the other two air bearings 6a and 6c in the foot 5 of column 8.

A ring 31 is mounted (via a gasket) to the bottom of spring plate 32, concentric to the axis of column 8; and, in turn, an annular elastomeric sealing lip 30 is secured to the lower end face of ring 31, thus forming a downwardly open cup or bell 34, having a flexible sealing lip (30) at its lower end, and closed at its upper end by the gasketed connection to spring plate 32. Partial evacuation within cup 34 is via a side port 33 in ring 31 to a suction line 35. The described structure establishes a spring-suspended suction bell which draws the foot 5 of column 8 with added downward force, against the surface of the table 2, as and to the extent that lip 30 is forced to resiliently yield to the vacuum condition. This force is dependent (i) on the pressure difference between atmospheric pressure and the subatmospheric pressure ($P-$) within the suction bell 34, and (ii) on the cross-sectional area of the region enclosed by the sealing lip 30.

By means of the nut 37 for bearing 6b (and the corresponding nut 37 for each of the other two air bearings 6a, b, c), the suction cup 34 can be so displaced in height that the sealing lip 30 just establishes a vacuum seal whereby lip 30 is not pulled with too great force against the surface of the table. The friction between the sealing lip 30 and the surface of the table can thereby thus be minimized. No deformation of the column 8 or its foot 5 can be attributed to the addition of the suction bell, since the latter rests directly on the air bearings and the flow of preload force therefore effectively by-passes the column.

In the present embodiment, the invention has been shown in application to a coordinate-measuring machine having a column which is displaceable linearly in one direction and at the same time is supported for rotation by means of its surface-riding bearing configuration. The invention is, however, similarly applicable to coordinate-measuring machines having a column which is guided for free movement over the table surface 2, as for example in two component directions x, y which are perpendicular to each other.

Figure 4:
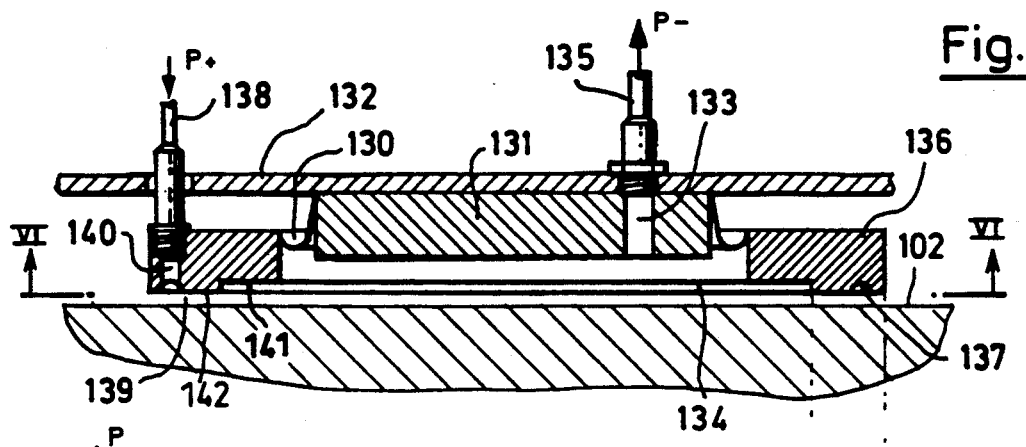
FIG. 4 is a vertical section, to show a suction bell alternative for a portion of the structure of FIG. 3.
Figure 5:
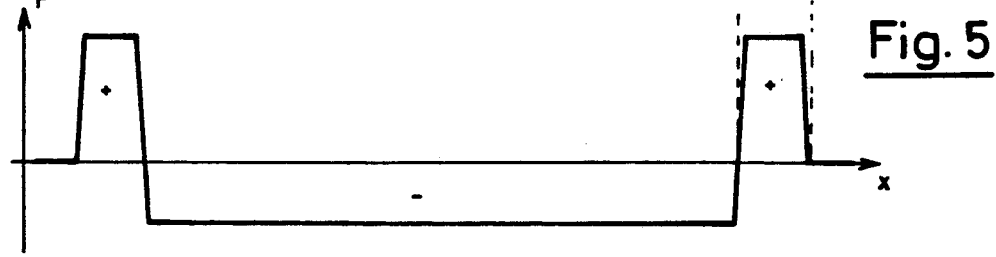
FIG. 5 is a graph which shows the radial distribution of support and preloading pressure across the section of FIG. 4.
Figure 6:
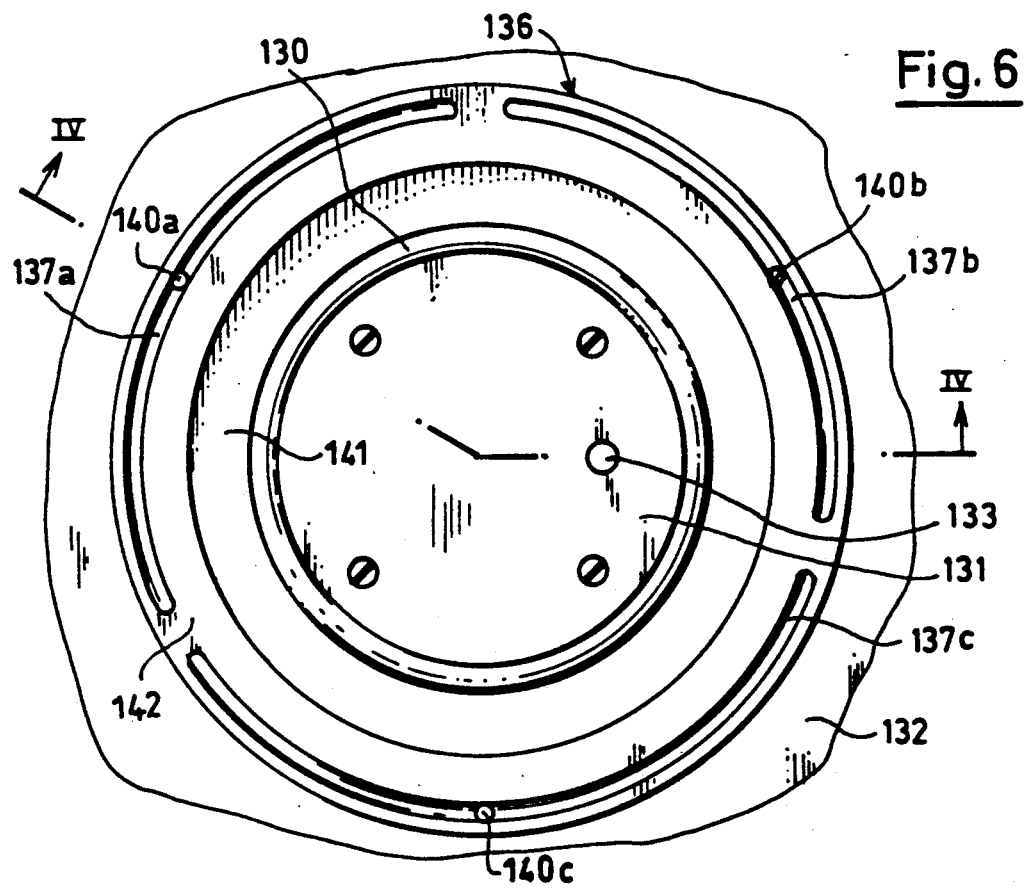
FIG. 6 is a bottom view of the suction bell of FIG. 4.

FIGS. 4 to 6 show another suction-bell embodiment, wherein the surface of the machine table is designated 102 and wherein preload force developed by suction-bell action will be understood to be applied directly to the air bearings 6a–c by means of the spring plate 132.

The suction bell at the bottom of the spring plate 132 has a central base or body 131 which is connected via a port 133 to the connecting line 135 for the vacuum to be produced within the suction bell. Body 131 is hermetically connected to a sealing ring 136 via an annular roller membrane 130. The sealing ring 136 floats on the table surface 102. To this end, an annular channel or groove 137 is formed in the bottom surface of the sealing ring 136, and the annular channel is connected for pressurized air supply via a port 140 to a pressurized-air line 138. Ring 136 thus forms an air bearing which floats on the table surface 102 and a capillary-thickness gap 139 of this air bearing effectively seals off the internal volume of 134 of the suction bell formed by parts 130, 131 and 136, the seal being operative to isolate the evacuated volume of the suction bell from and with respect to atmospheric (i.e. external) pressure. Advisedly, pressure in the annular channel 137 is selected to maintain the bearing gap 139 at a gap height of about 6 μm. A gap of this very small height provides sufficiently high resistance to flow, for the relatively small vacuum condition within the suction bell, that a suction pump of low capacity can maintain the vacuum condition, and the flexible roller membrane 130 effectively disconnects the sealing ring 16 from body 131. For mounting and in operation, large vertical changes in height between the table surface 102 and the machine part, which is preloaded against it by suction-bell action, are thus permissible without impairment of the sealing function; and the sealing gap 139 remains constant. No expensive adjustment of the air bearings which support the machine part (or which float the suction bell) is necessary; and, since there is no contact between the suction bell and the table surface, all friction or wear is avoided.

As can be noted from FIG. 6, the annular channel 137 is advisedly divided into three individual segments 137a, b and c, each of which extends over an angular region close to 120°, and each of these segments is supplied with pressurized air via individually throttled admission through bore holes 140a, b, c. The described arrangement enables the sealing ring 136 to stabilize against tilting on the table surface 102, and the sealing gap 139 remains constant over the entire outer circumference of the ring 136.

In FIG. 5, the pressure below the suction bell 134 is plotted against its diameter. It can be seen that in the region of the sealing ring 136, positive pressure (P+) prevails on the outer periphery. On the other hand, the underside of ring 136 is shown with a shallow counter-bore 141, whereby to extend the area of vacuum application, leaving a relatively narrow band 142 within which the arcuate groove formations 140a, b, c are made. Thus, FIG. 5 shows, within the inner circular margin of band 142 that the vacuum condition (P−) prevailing in the suction bell acts independently on the sealing ring 136 and on body 131, whereby the latter draws down the spring plate 132 and thereby applies downward preloading force to all three of the air bearings 6a, b, c. At the same time, the sealing ring is stabilized in its short-gap relation 139 to the guide surface 102; and it will be understood that in FIG. 4, this small gap 139 is shown with exaggeration so as to make the point that preloading of bearings 6a, b, c is accomplished without mechanical contact with surface 102.

The particular coordinate-measuring machine to which the vacuum-operated preloading means of the invention has been applied in the foregoing description is the subject of copending patent application Ser. No. 07/651143, filed on or about Feb. 6, 1991. Said copending application contains further description of multiple-coordinate drives and their control and, therefore, the disclosure of said copending application is hereby incorporated by reference.

What is claimed is:

1. A device for preloading a guided machine part (5–8) which rests via several bearings (6a–c) on its guide (2), characterized by the fact that said device is a suction bell (34, 134) arranged between the bearings.

2. A device in accordance with claim 1, characterized by the fact that the suction bell (34) is arranged directly on the guide surface (2) for the machine part (5–8).

3. A device according to claim 1, characterized by the fact that the effective area of the suction bell (34) is large as compared with the effective surface of the bearings (6a–c) on which the machine part (5–8) rests.

4. A device according to claim 1, characterized by the fact that the suction bell (34) is mounted to the machine part (5–8) in the vicinity of bearings for said machine part.

5. A device according to claim 1, characterized by the fact that the suction bell (34) is connected under spring action to the machine part (8).

6. A device according to claim 1, characterized by the fact that the bearings (6a–c) are gas bearings or air bearings.

7. A device according to claim 1, characterized by the fact that the machine part (5–8) rests movably on a flat guide (2) with respect to two degrees of freedom.

8. A device according to claim 1, characterized by the fact that the suction bell (34) has an elastic sealing lip (30) which rests with slight friction on the guide surface (2).

9. A device according to claim 1, characterized by the fact that the suction bell (134) is sealed off via a sealing ring (136) which floats on the guide surface (102).

10. A device according to claim 9, characterized by the fact that the ring (136) is developed in the manner of an air bearing having a bearing gap (139) which is so small as to exhibit capillary sealing action, said ring (136) being connected via a flexible membrane (130) in air-tight manner with a bearing body (131) of the suction bell (134).

11. A coordinate-measuring machine having a movable machine part (5–8) which is guided in at least one direction and rests via several bearings (6a–c) on its guide (2), the bearings being preloaded by an additional device, characterized by the fact that said additional device is a suction bell (34) which is arranged between the bearings (6a–c) and pulls the machine part against the guide (2) as a result of a vacuum condition within the suction bell.

12. The coordinate-measuring machine of claim 11, (a) in which the guide (2) is a flat horizontal table surface, (b) in which the machine part is a column (8) extending on a vertical axis upward from a triangular foot (5), and (c) in which said bearings are air-bearing elements (6a–c) fixed to the respective corners of the triangular foot (5) and reacting directly with said table surface, at equally spaced locations external of the suction bell (34).

13. The coordinate-measuring machine of claim 12, in which the suction bell (34) is configured to present a circular-perimeter vacuum-sealing relation with said table surface, said circular perimeter being concentric with the vertical axis.

14. The coordinate-measuring machine of claim 13, in which said suction bell (34) is mounted to a plate (132) which is connected to all said bearings, for transmission of vacuum-induced preloading forces simultaneously to all of said bearings independently of preloading forces to said foot or to said column.

15. The coordinate-measuring machine of claim 14, in which said plate is stiffly compliant, for compliant application of preloading force to the respective individual air bearing elements.

16. The coordinate-measuring machine of claim 13, in which said column carries a measurement arm (21) which extends radially outward of the column axis, and in which said column and its foot and its air bearing elements and its suction bell are all rotatable as a unit about the axis of said column.

* * * * *